United States Patent [19]
Williams et al.

[11] Patent Number: 6,094,702
[45] Date of Patent: Jul. 25, 2000

[54] METHOD AND APPARATUS FOR ENABLING ACCESS TO COMPUTER SYSTEM RESOURCES

[75] Inventors: Brett L. Williams, Eagle; Donald D. Baldwin, Boise; Todd Farrell, Meridian, all of Id.

[73] Assignee: Micron Technology, Inc., Boise, Id.

[21] Appl. No.: 08/960,854

[22] Filed: Oct. 30, 1997

[51] Int. Cl.⁷ .............................. G06F 13/00; G06F 12/00
[52] U.S. Cl. ..................... 711/101; 711/100; 711/113; 711/118; 711/107; 395/500; 395/712; 395/182.01; 395/284; 709/225; 709/223; 380/4; 380/23; 380/25; 380/21
[58] Field of Search .................................. 380/415, 4, 23, 380/25, 21; 379/189; 395/200.55, 500, 200.54, 200.53, 200.56, 182.01, 284, 651, 674, 712; 370/249; 707/103; 711/100, 113, 118, 107, 140, 141, 146, 163, 200, 1–5, 101; 710/102; 712/1; 365/48

[56] References Cited

U.S. PATENT DOCUMENTS

| | | | |
|---|---|---|---|
| 5,509,070 | 4/1996 | Schull | 380/4 |
| 5,778,070 | 7/1998 | Matisson | 380/25 |
| 5,805,802 | 9/1998 | Marx | 380/4 |

OTHER PUBLICATIONS

Computer Dictionary, Microsoft Press, 3erd Ed, 1997.

*Primary Examiner*—Frank J. Asta
*Assistant Examiner*—Beatriz Prieto
*Attorney, Agent, or Firm*—Dorsey & Whitney LLP

[57] ABSTRACT

An application-specific integrated circuit (ASIC) for enabling access to memory. ASIC includes a decryptor, a valid authorization storage component, an upgrade verifier, an upgrade storage component, and an enabling component. The decryptor inputs an encrypted authorization code and outputs a decrypted authorization code. The valid authorization storage component stores and outputs a valid authorization code. The upgrade verifier inputs the decrypted authorization code and the valid authorization code, compares the decrypted authorization code to the valid authorization code to determine whether access to the portion of memory is authorized, and outputs a signal to enable access to the portion of memory. The upgrade storage component stores the signal output from the upgrade verifier. The enabling component inputs a memory access signal and a signal stored in the upgrade storage component and outputs a signal indicating whether the portion of memory is enabled.

29 Claims, 8 Drawing Sheets

METHOD AND APPARATUS FOR ENABLING ACCESS TO COMPUTER SYSTEM RESOURCES

TECHNICAL FIELD

The present invention relates generally to computer systems and in particular to providing access to resources of computer systems.

BACKGROUND OF THE INVENTION

Computer systems, such as personal computers, are available in a variety of hardware configurations. The hardware configuration of a computer system specifies the type and amount of each hardware resource that is included into the computer system. A computer system may include a certain type of a central processing unit, a certain type and amount of disk storage, a certain type and amount of memory, and other components such as modems and graphics accelerator boards. The manufacturers of computer systems generally design them so that their configuration can be upgraded after being purchased by a customer. The computer systems can be upgraded by adding hardware resources to improve its performance. For example, a computer system may, when it is sold, be initially configured with 16 megabytes of random access memory ("RAM") and with unfilled sockets available for adding an additional 64 megabytes of RAM. The initial configuration, however, may not include enough hardware resources to meet the user's needs. Even if the computer system initially includes enough hardware resources to meet the user's current needs, the user's needs may change in time so that the resources may not be enough. Consequently, users often upgrade their computer systems by adding additional hardware resources. For example, a user with a computer system that is currently configured with 16 megabytes of RAM, may upgrade to 32 megabytes of RAM by adding 16 megabytes of RAM to allow more programs to reside in RAM simultaneously. Also, a user may add an additional modem or replace an existing modem with a faster modem to increase communications speed. A user may also add a graphics accelerator board to reduce the time needed to display graphics data.

The upgrading of a computer system, however, can be problematic for most computer users. The upgrading may involve removing the cover of the computer system, removing various boards on the computer system, and installing new chips or additional boards. Because users are generally not technically knowledgeable about computer system hardware, the users are typically apprehensive about performing the upgrades themselves. As a result, when an upgrade is needed, a user will typically pay a technical specialist to perform the upgrade. The use of a technical specialist, however, may greatly increase the cost of the upgrade. Moreover, even a technical specialist may have difficulty in performing some upgrades. For example, when additional memory is added, the chips may need to be inserted into sockets. In the process of inserting the chips into a socket, the leads on the chips may be broken or bent rendering the chips useless. Also, it may be difficult for a technical specialist to even determine which types of memory are compatible with the computer system.

SUMMARY OF THE INVENTION

An embodiment of the present invention provides an upgrade system for enabling access to hardware resources present in a computer system but not currently enabled. The upgrade system comprises a vendor upgrade component, a customer upgrade component, and an upgrade controller. The vendor upgrade component generates unique authorization codes for enabling the hardware resources (e.g., memory) of a computer system. The customer upgrade component receives the unique authorization code and provides the authorization code to the upgrade controller. The upgrade controller receives from the customer upgrade component the unique authorization code, authenticates the unique authorization code, and when authenticated, enables the hardware resources of the computer system. In this way, computer systems can be shipped with hardware resources that can be enabled later.

More generally, an embodiment provides an upgrade controller for enabling access to a resource of a device (e.g., computer system or consumer electronic devices). The upgrade controller includes input lines, an access verifier, a storage component, and output lines. The input lines receive into the upgrade controller an authorization code for access to the resource. The access verifier is connected to the input lines and determines whether the authorization code is proper and that, when the authorization is proper, generates a signal to enable access to the resource. The storage component is connected to the generated signal of the access verifier and stores the generated signal. The output lines output from the upgrade controller the signal stored in the storage component. The output lines can be connected to enablement lines of various hardware resources to enable the resources when an authorization code is presented to the upgrade controller.

DETAILED DESCRIPTION OF THE INVENTION

An embodiment of the present invention provides an upgrade system for enabling access to hardware resources that are currently installed in the computer system, but not yet enabled. By using the upgrade system, a manufacturer can install hardware resources that are not enabled when the computer system is sold. For example, the computer system can have 80 megabytes of RAM installed, but only 16 megabytes are enabled. When a customer wishes to add a new type of hardware resource or increase the amount of hardware resources, the customer would purchase access to the additional resources from the manufacturer and receive an authorization code. The customer would input the authorization code to the upgrade system of the customer's computer system. The upgrade system would authenticate the authorization code and, if authentic, would enable the resource identified by the authorization code. For example, the authorization code may specify to enable an additional 16 megabytes of RAM. In this way, customers can upgrade their computer systems without the problems associated with installing new hardware resources. A manufacturer can also manufacture a standard computer system with a standard set of installed hardware resources and use the upgrade system to customize the initial configuration. Indeed, the cost savings of mass producing computer systems with a standard set of installed hardware resources may outweigh the increased cost of the installed hardware resources that are not enabled. Also, the ease of upgrade may be very attractive to potential customers.

In one embodiment, the upgrade system comprises hardware and software components. The hardware component, referred to as an upgrade controller, controls the enabling of various hardware resources. When the upgrade controller receives the proper authorization, such as an encrypted authorization code, the upgrade controller first verifies whether the authorization is proper, and if so, enables the hardware resources (e.g., additional memory). The software components include a vendor upgrade component and a customer upgrade component. The vendor upgrade component, in response to a request to enable additional hardware resources for a customer's computer system, generates an encrypted authorization code for the additional hardware resources. The vendor can then supply the encrypted authorization code to the customer. The customer can then provide the encrypted authorization code to the customer upgrade component. When the customer upgrade component receives the authorization code, it provides the authorization code to an upgrade controller. The upgrade controller confirms the authenticity of the authorization code. If the authorization code is authentic, then the upgrade controller enables the additional hardware resources indicated by the authorization code. The authorization codes are preferably unique to each customer's computer system. That is, an authorization code generated for one computer system, will not be a proper authorization code for another computer system. In this way, the vendor can ensure that an authorization code cannot be used to enable additional hardware resources on different computer systems.

Figure 1:
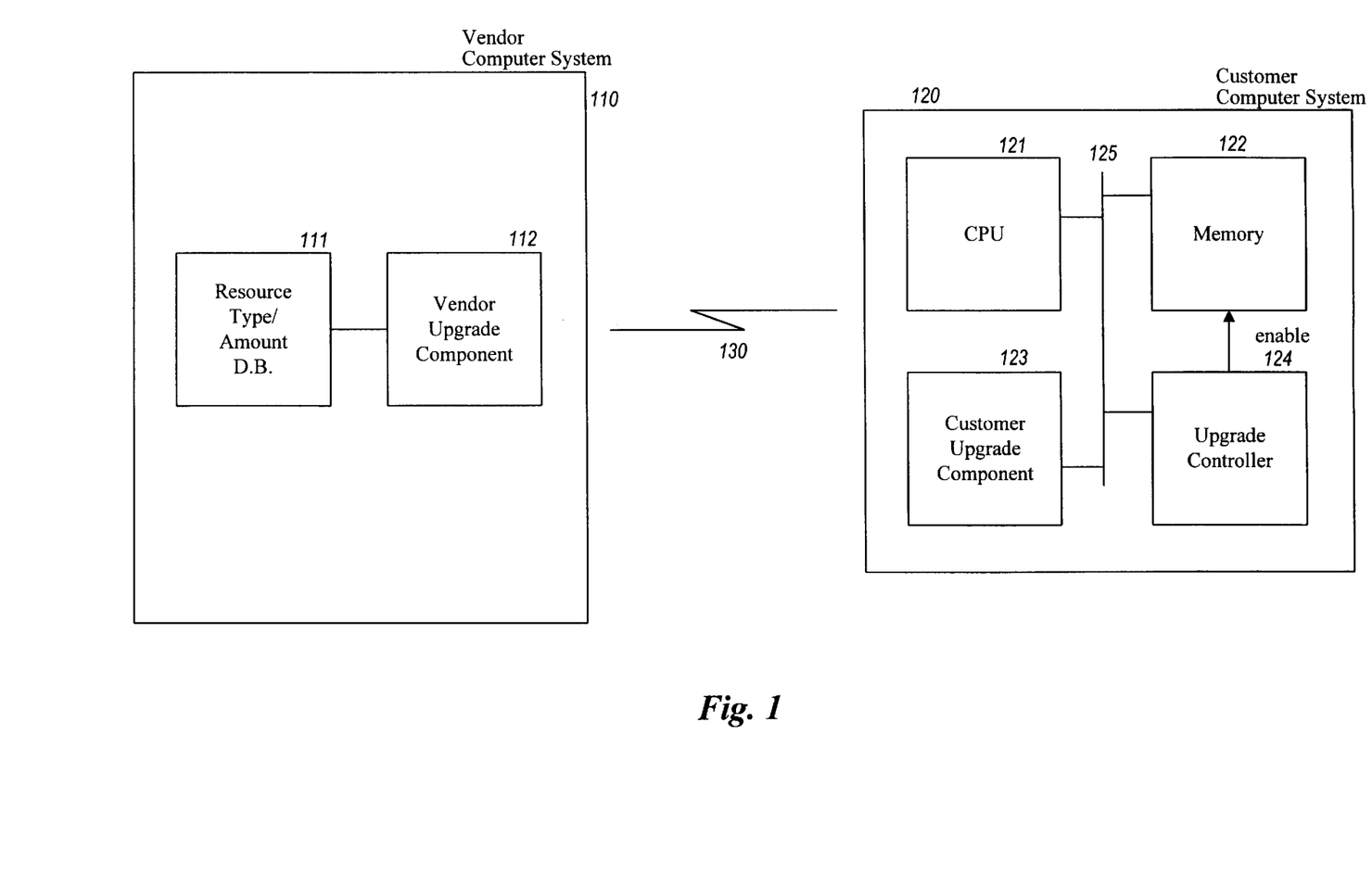
FIG. 1 is a block diagram illustrating the upgrade system.

FIG. 1 is a block diagram illustrating the upgrade system. The upgrade system comprises components stored on a vendor computer system 110 and a customer computer system 120. The vendor computer system includes a vendor upgrade component 112 and a resource type/amount database 111. The vendor upgrade component receives requests to upgrade customers' computer systems. A request may include the serial number of the customer's computer system, the resource type (e.g., main memory), and the upgrade amount of the resource (e.g., 16 megabytes). Alternatively, rather than providing the serial number, the request can identify the customer, and assuming the customer has only one computer system, the vendor upgrade component can identify that serial number from a customer/serial number database. The vendor upgrade component combines the resource type, upgrade amount, and serial number to form an authorization code. The vendor upgrade component then encrypts the authorization code. A representative of the vendor can then provide the encrypted authorization code to the customer. The customer can then input the encrypted authorization code into the customer computer system. Alternatively, the customer and vendor computer systems can communicate via communications link 130. The communications link can be through a direct dial-up connection, through the Internet, or through any other communications mechanism. The authorization code can be downloaded directly to the customer computer system via the communications link. The encrypted authorization code can alternatively be stored on a computer-readable medium, such as a disk, which is provided to the customer. The customer computer system comprises a central processing unit 121, memory 122, a customer upgrade component 123, and an upgrade controller 124. These components are interconnected via bus 125. The memory may include various types of memory such as dynamic or static RAM and may include various high-speed caches. The customer upgrade component may be initially stored on an external device, such as a hard disk, and is loaded into memory for execution or may be stored in ROM. The customer upgrades the computer system by executing the customer upgrade component which prompts the customer for the encrypted authorization code. The customer upgrade component provides the encrypted authorization code to the upgrade controller. The upgrade controller may be assigned an input/output port through which it can receive and send data. When the upgrade controller receives the encrypted authorization code, the upgrade controller decrypts the authorization code and compares the serial number, resource type, and upgrade amount to information stored on the upgrade controller. In one embodiment, the upgrade controller is an application-specific integrated circuit. If the upgrade controller determines that the authorization code is authentic, then the upgrade controller enables various additional system resources, such as memory in this example.

Figure 2:
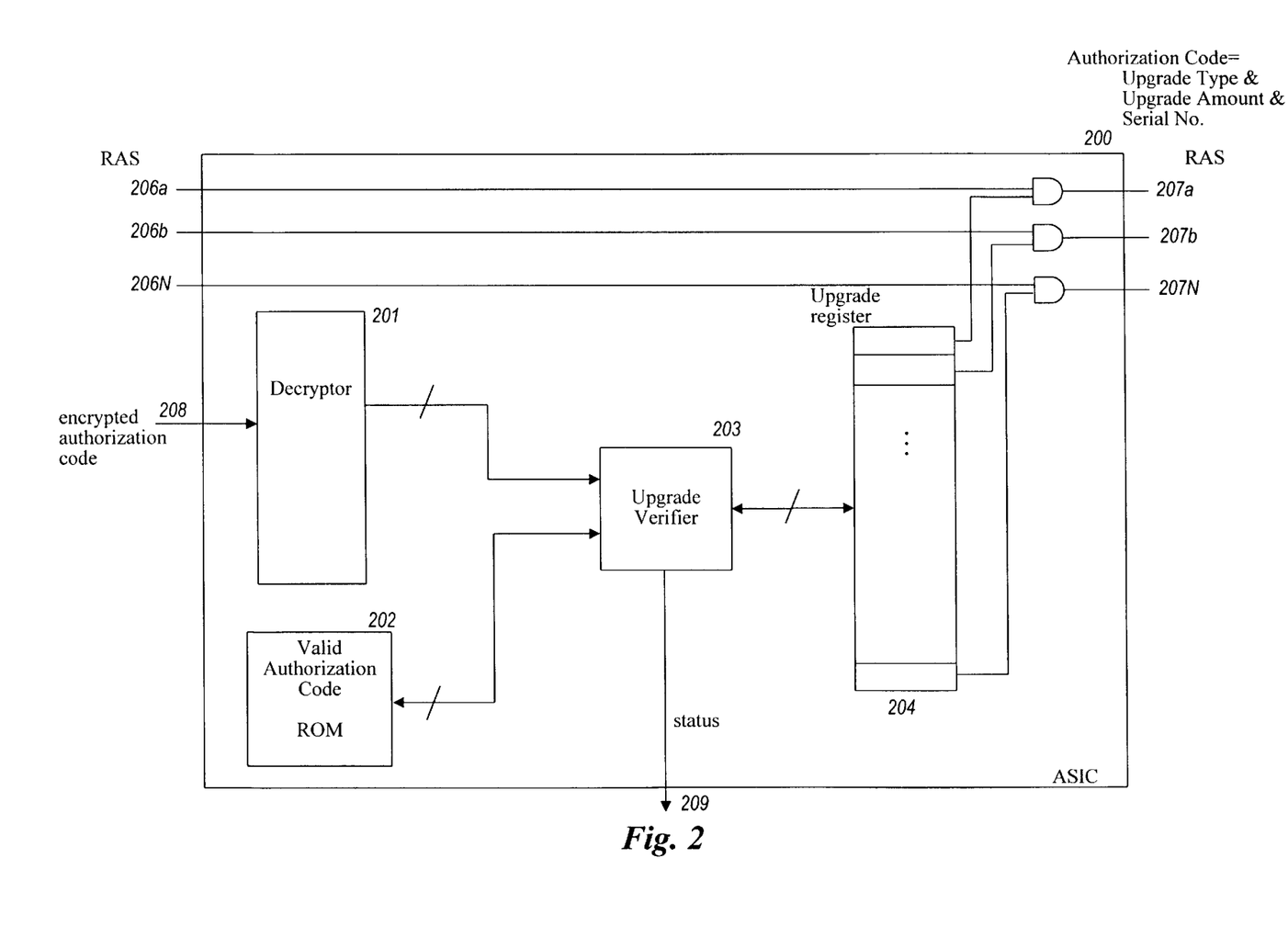
FIG. 2 is a block diagram of one embodiment of an upgrade controller.

FIG. 2 is a block diagram of one embodiment of an upgrade controller. The upgrade controller includes a decryptor 201, a valid authorization code ROM 202, an upgrade verifier 203, an upgrade register 204, and various enabling components 205a–205n. The input lines to the upgrade controller include RAS lines 206a–206n and encrypted authorization code lines 208. The output lines from upgrade controller include RAS output lines 207a–207n and a status line 209. The RAS (row access strobe) lines connect the memory controller to various memory banks (not shown) through the upgrade controller. The memory controller uses the RAS lines to enable various memory banks when accessing memory. When a computer system is booted, a typical initialization process scans memory to determine the amount of memory available. When scanning, the initialization process writes data to and then read data from various locations in memory. If the data read from a location is the same as the data written, then the initialization process may assume that that memory location is available. Otherwise, the initialization process may determine that the memory location is unavailable. The upgrade controller selectively enables bits of the upgrade register to control the enabling components (e.g., AND gates). By changing the values in the upgrade register, the upgrade controller either enables or disables the output of various RAS lines, which in turn enable additional banks of memory. The upgrade register is preferably non-volatile so that when the system is next booted, the initialization process will recognize that additional memory is available. Alternatively, the upgrade register could be volatile, and during the initialization process, an encrypted authorization code stored, for example, on disk could be provided to the upgrade controller which would set the upgrade register accordingly.

When an encrypted authorization code is supplied to the decryptor 201, the decryptor decrypts the encrypted authorization code and provides the decrypted authorization code to the upgrade verifier. The upgrade verifier compares the decrypted authorization code to possible valid authorization codes that are stored in a read only memory. These valid authorization codes can include various combinations of resource types and upgrade amounts. The valid authorization code also includes the serial number of the computer system. These valid authorization codes can be stored in the ROM when the computer system is manufactured via input lines that are not shown. When the upgrade verifier determines that the resource type, upgrade amount, and serial number of the decrypted authorization code match a valid authorization code in ROM, then the upgrade verifier sets the appropriate bits in the upgrade register. From that point on, the output lines of the upgrade register enable the corresponding enabling components so that the corresponding banks can be enabled by the memory controller. The various components of the upgrade controller can take on various forms. For example, the upgrade register can be implemented alternatively as a flash EPROM or static RAM. The decryptor 201 may be several well-known components to decrypt an encrypted authorization code using a predefined key. The predefined key can be built into the upgrade controller. The upgrade controller can be implemented using discrete logic, as a program executed by a processor, or as an ASIC. Also, the authorization codes can have various forms. For example, the authorization code could be unencrypted passwords, and unique passwords for each resource and each computer system can be stored on the ROM. In this way, the decryptor would not be needed.

The upgrade controller of FIG. 2 can be used to enable hardware resources other than dynamic RAM. That is, the input lines 206a–206n and the output lines 207a–207n can be connected to different types of hardware resources, and each line may even be used to enable a completely different resource. For example, one output line can be used to enable a graphics accelerator and another output line can be used to enable a high-speed modem.

The storing of the valid authorization code in the ROM of the upgrade controller can help ensure that it would be difficult for someone to break the encryption scheme. Since the valid authorization codes are stored in ROM, that is not readable outside the upgrade controller, a person would find it very difficult to identify the authorization code to help in breaking the scheme. Alternatively, the valid authorization codes could be stored in encrypted form on the ROM and decrypted before being supplied to the upgrade verifier. This encrypting alternative would further reduce the chance of a user bypassing the authorization mechanism of the upgrade controller. Also, the upgrade controller can be implemented without any decryption or verification mechanism if the customer base is such that unauthorized use of authorization codes is unlikely.

Figure 3:
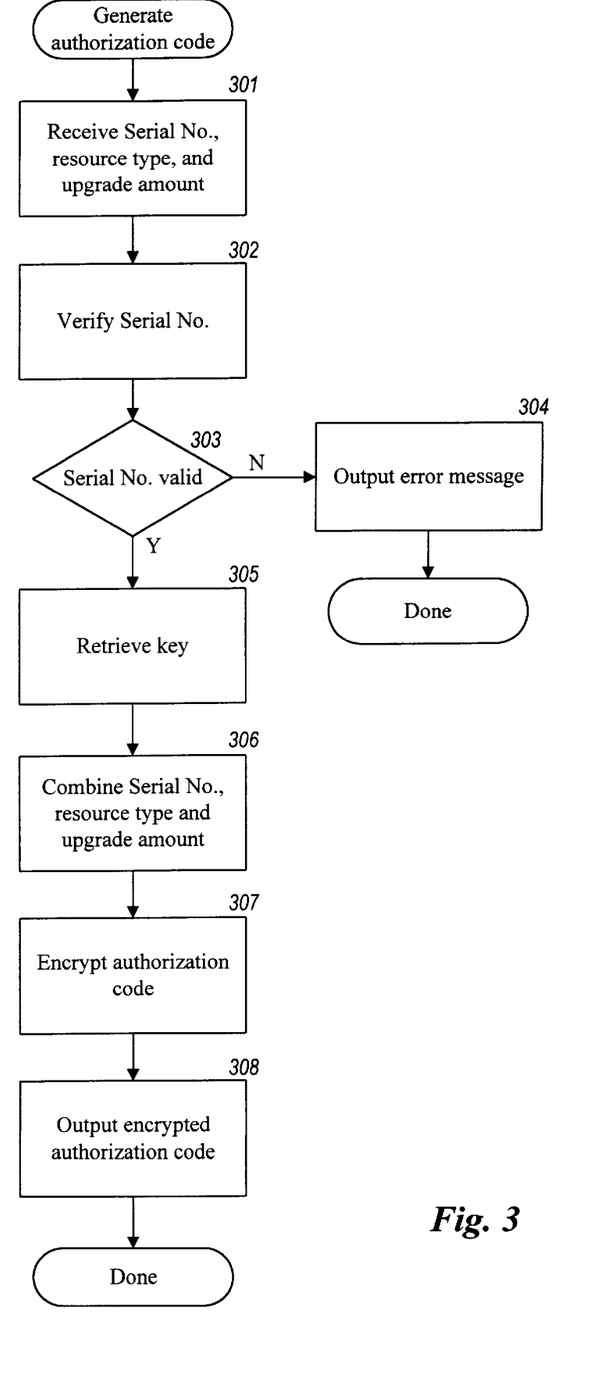
FIG. 3 is a flow diagram of a routine to generate an encrypted authorization code.

FIG. 3 is a flow diagram of a routine to generate an encrypted authorization code. This routine is invoked by the vendor upgrade component. The vendor upgrade component can be a stand-alone program that representatives of the vendor execute in response to customer requests for an upgrade. Alternatively, the vendor upgrade component can be provided as a web page through which a customer interacts or through which the customer upgrade component interacts. In step 301, the routine receives a serial number, resource type, and upgrade amount. In step 302, the routine may optionally verify whether the serial number, resource type, and upgrade amount are valid by checking a database. In step 303, if the serial number, resource type, and upgrade amount are valid, then the routine continues at step 305, else the routine continues at step 304. In step 304, the routine outputs an error message and completes. In step 305, the routine retrieves a key to use when encrypting the authorization code. In step 306, the routine combines the serial number, resource type, and upgrade amount to form the authorization code. In step 307, the routine encrypts the authorization code using the retrieved key. In step 308, the routine outputs the encrypted authorization code.

Figure 4:
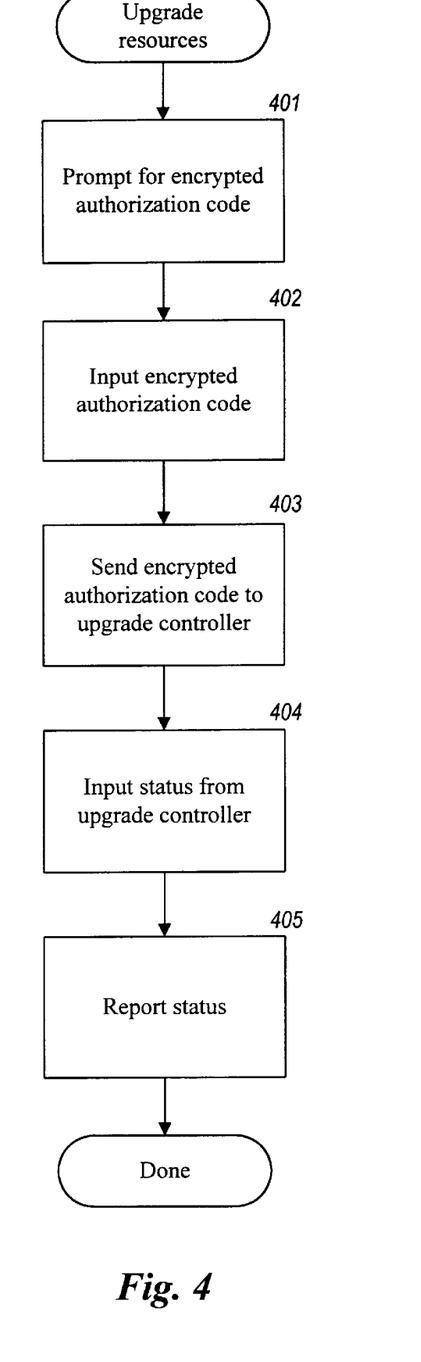
FIG. 4 is a flow diagram of a routine to upgrade resources.

FIG. 4 is a flow diagram of a routine to upgrade resources. The upgrade resources routine is an implementation of the customer upgrade component. In step 401, the routine prompts for an encrypted authorization code. In step 402, the routine inputs the encrypted authorization code. Alternatively, this routine can communicate directly via a communications link with the vendor's computer system to generate and retrieve the authorization code. In step 403, the routine sends the encrypted authorization code to the upgrade controller. In step 404, the routine waits for a status from the upgrade controller. In step 405, the routine reports the status and returns.

Figure 5:
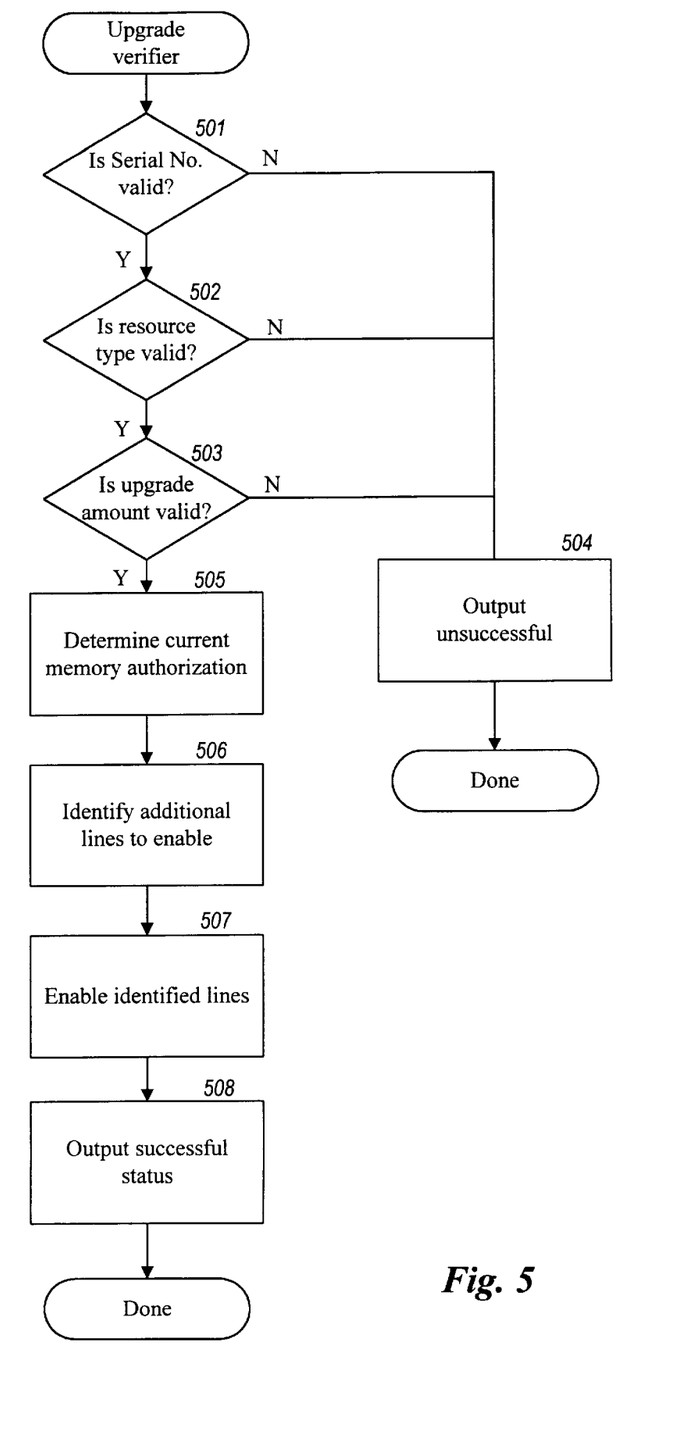
FIG. 5 is a flow diagram illustrating the processing performed by the upgrade verifier component of the upgrade controller.

FIG. 5 is a flow diagram illustrating the processing performed by the upgrade verifier component of the upgrade controller. This processing ensures that the decrypted authorization code is valid and sets the appropriate bits in the upgrade register. In step 501, if the serial number is valid, then the processing continues at step 502, else the processing continues at step 504. In step 502, if the resource type is valid, then the processing continues at step 503, else the processing continues at step 504. In step 503, if the upgrade amount is valid, then the processing continues at step 505, else the processing continues at step 504. In step 504, the processing outputs an unsuccessful message on the status line and completes. In step 505, the processing determines the current memory authorization. This determination can be made by analyzing the number of bits set in the upgrade register. Alternatively, the authorization code can directly specify which bits of the upgrade register to enable. In step 506, the processing identifies the additional lines to enable the upgrade amount. In step 507, the processing enables the identified lines. In step 508, the processing outputs a successful status signal on the status line and completes.

Figure 6:
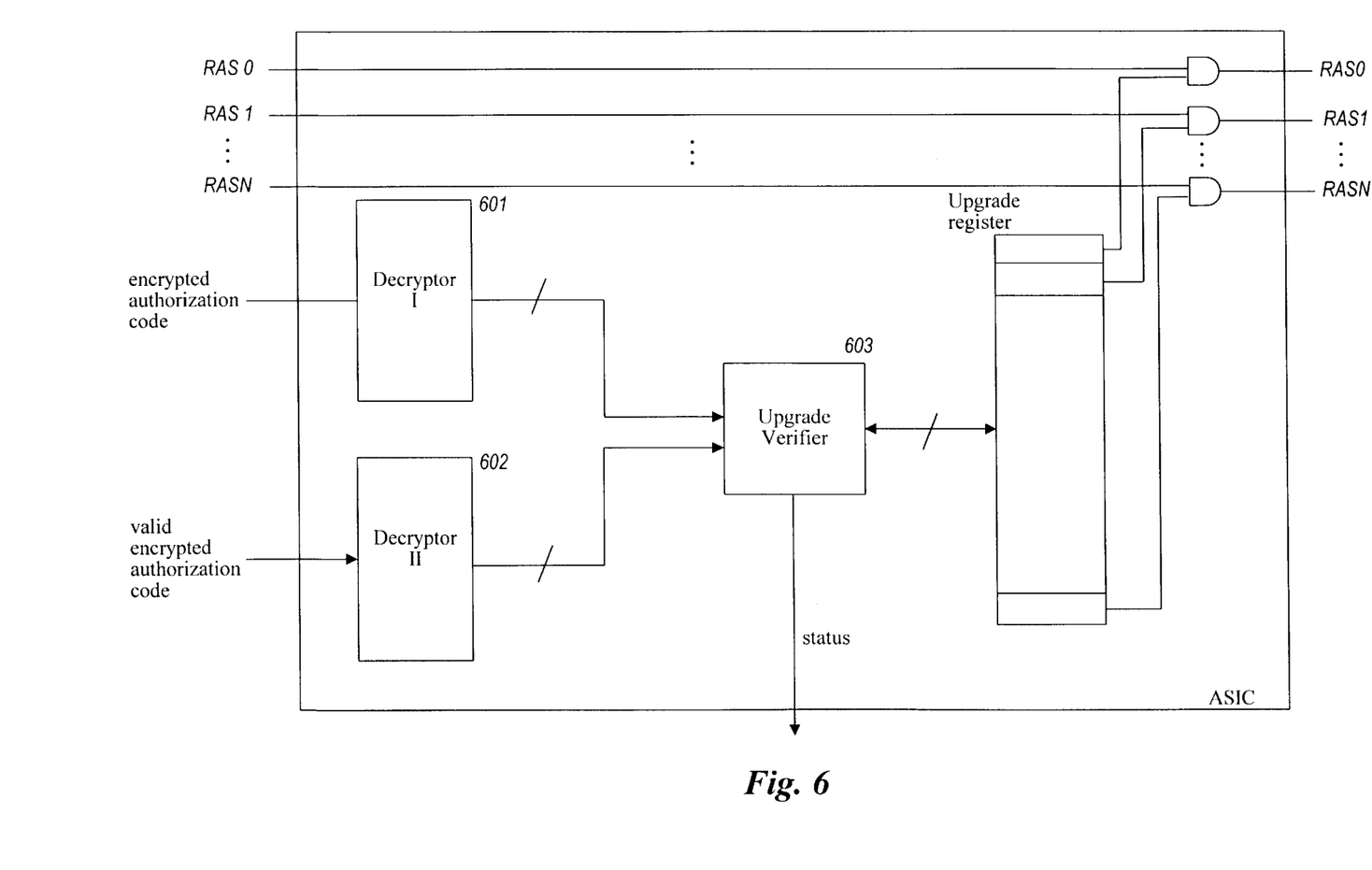
FIG. 6 is a block diagram of an alternative upgrade controller.

FIG. 6 is a block diagram of an alternative upgrade controller. This alternative upgrade controller does not store the valid authorization code in the upgrade controller. Rather, the valid authorization codes can be stored in storage external to the upgrade controller, such as in ROM on the motherboard. When the encrypted authorization code is provided to the upgrade controller, an upgrade resources routine of the customer upgrade component retrieves the valid encrypted authorization codes from storage. The customer-supplied and the valid authorization codes are encrypted using different keys. If these authorization codes were encrypted using the same key, then it may be possible to read the contents of the ROM on the motherboard and provide that contents as the encrypted authorization code. The upgrade controller contains a decryptor 601, decryptor 602, and a modified upgrade verifier 603. The decryptors 601 and 602 decrypt the corresponding authorization codes using different keys and provide the authorization codes to the upgrade verifier. The upgrade verifier determines whether the authorization codes are the same and updates the update register accordingly.

Figure 7:
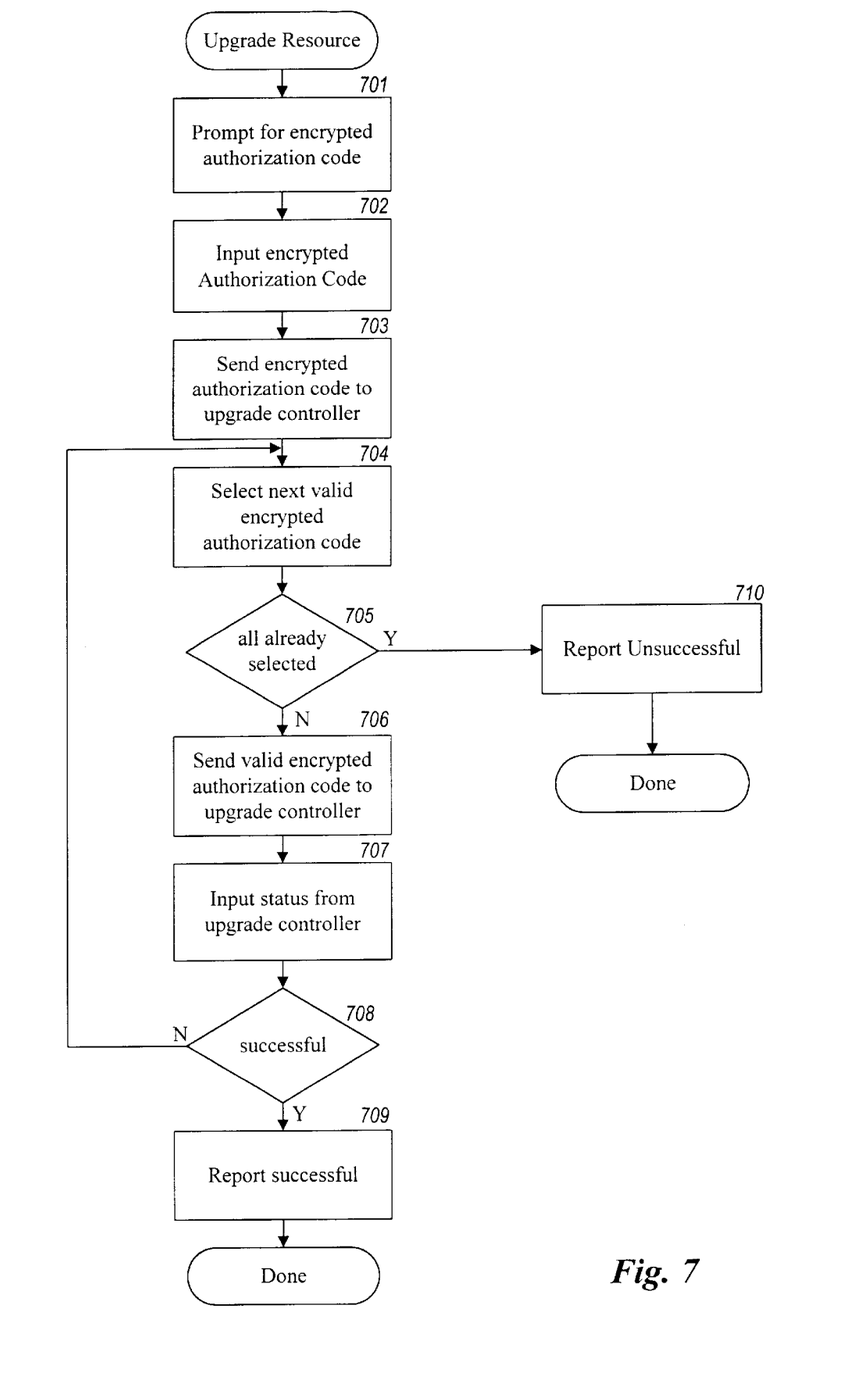
FIG. 7 is a flow diagram of a routine used to upgrade a resource that is used in conjunction with the alternative upgrade controller of FIG. 6.

FIG. 7 is a flow diagram of a routine used to upgrade a resource that is used in conjunction with the alternative upgrade controller of FIG. 6.

The upgrade resources routine inputs the encrypted authorization code and loops providing various valid encrypted authorization codes along with the customersupplied encrypted authorization code to the upgrade controller, until the upgrade controller signals that the upgrade was successful. In step 701, the routine prompts the customer for the encrypted authorization code. In step 702, the routine inputs the encrypted authorization code. In step 703, the routine sends the encrypted authorization code to the upgrade controller. In steps 704–708, the routine loops providing each valid encrypted authorization code to the upgrade controller until the upgrade is successful. In step 704, the routine selects the next valid encrypted authorization code from the ROM. In step 705, if all the valid encrypted authorization codes have already been selected, then the routine continues at step 710, else the routine continues at step 706. In step 706, the routine sends the retrieved valid encrypted authorization code to the upgrade controller. In step 707, the routine inputs the status indicating whether the upgrade was successful. In step 708, if the upgrade was successful, then the routine continues at step 709, else the routine loops to step 704 to select the next valid encrypted authorization code. In step 709, the routine displays a report that the upgrade was successful and completes. In step 710, the routine displays a report that the upgrade was unsuccessful and completes.

Figure 8:
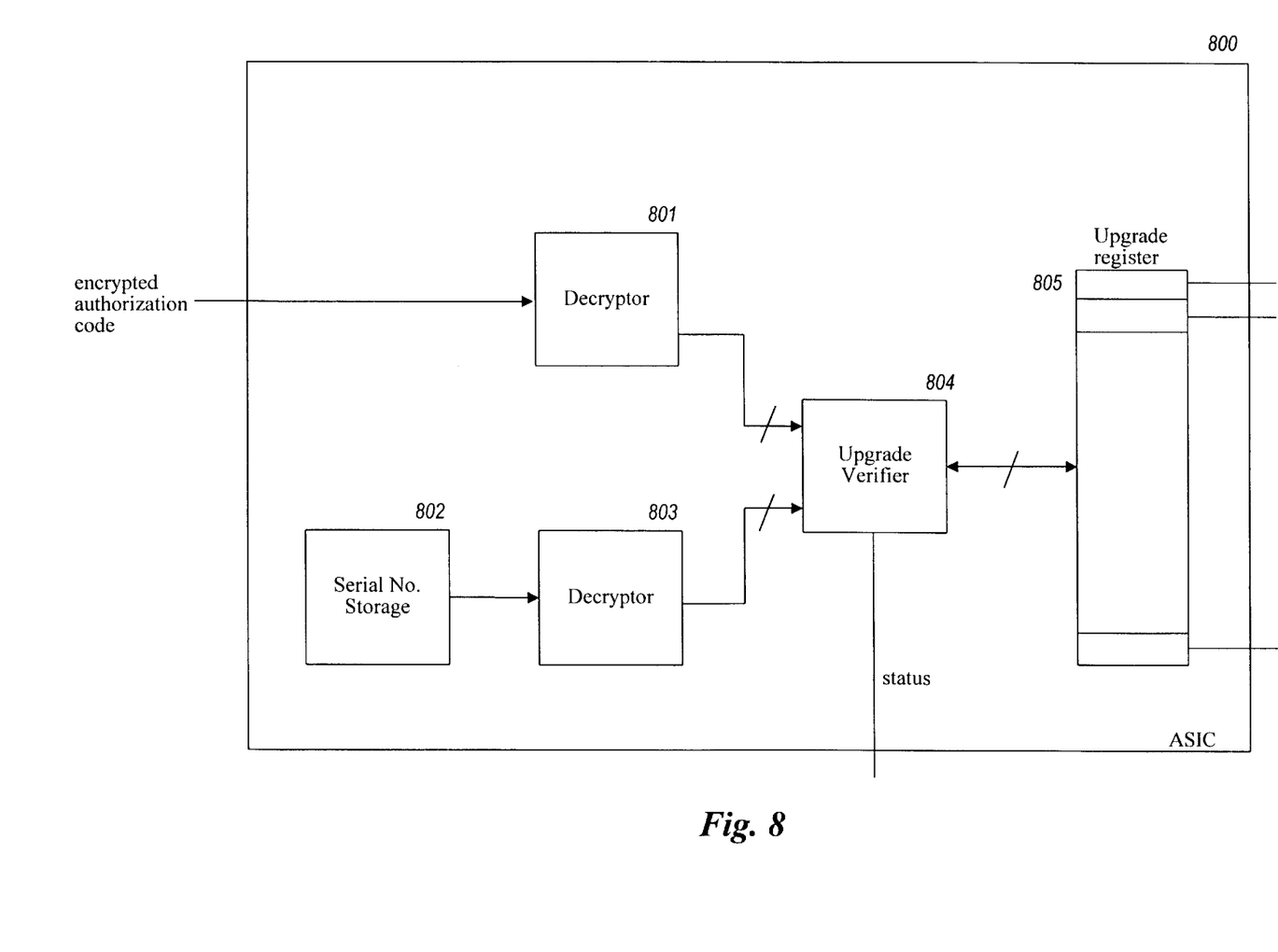
FIG. 8 is a block diagram of another alternative upgrade controller.

FIG. 8 is a block diagram of another alternative upgrade controller. This alternative upgrade controller can be used to control various types of hardware resources. The system resources need not be predefined when the upgrade controller is developed. Rather, the output of the upgrade register 805, is available to enable various hardware resources. Since the hardware resources are not predefined, the encrypted authorization code identifies the bits of the upgrade register to enable along with the serial number or password. The decryptor 801 decrypts the encrypted authorization code and provides the serial number and the indicator of which bits to enable to the upgrade verifier. The serial number is encoded into storage 802 in encrypted form. The decryptor 803 decrypts the serial number and provides it to the upgrade verifier. If the serial numbers match, then the upgrade verifier sets the bits in the upgrade register as appropriate.

While the present invention has been described with reference to various embodiments, those skilled in the art will appreciate that various changes in form may be made without departing from the spirit and scope of the invention. In particular, the upgrade system can be used to control hardware resources on equipment, other than computer systems. The upgrade system can be used with various consumer electronic devices, such as video cassette recorders, video cameras, televisions, or CD players, and with various other systems, such as automobiles. For example, a video camera may have an installed electronic image stabilization feature that can be enabled with an authorization code or an automobile may have a certain option that can be enabled with an authorization code. Also, the upgrade controller can be implemented on the same chip as a central processing unit, a memory controller, or other hardware component. A computer manufacturer may also "hardware wire" enable a minimum set of hardware resources so that regardless of the contents of the upgrade register the computer system can still function.

We claim:

1. An application-specific integrated circuit (ASIC) apparatus for enabling access, including any reading access, to a portion of memory having no access enabled, including having no reading access enabled, the ASIC apparatus comprising:

a decryptor that inputs an encrypted authorization code and outputs a decrypted authorization code;

a valid authorization storage component for storing and outputting a valid authorization code;

an upgrade verifier that inputs the decrypted authorization code and the valid authorization code, that compares the decrypted authorization to the valid authorization code to determine whether access to the portion of memory is authorized, and that outputs a signal to enable access including any reading access to the portion of memory, the portion of memory being in an inoperable state in which the portion of memory is unable to provide memory storage capacity based on having no access enabled including having no reading access;

an upgrade storage component that stores the signal output from the upgrade verifier; and an enabling component that inputs a memory access signal and a signal stored in the upgrade storage component and outputs a signal indicating whether the portion of memory is in an operable state in which the portion of memory has memory storage capacity based on having access enabled for reading from the portion of memory.

2. The apparatus of claim 1 wherein the upgrade storage component is a register.

3. The apparatus of claim 1 wherein the upgrade storage component is a flash EPROM.

4. The apparatus of claim 1 wherein the upgrade storage component is a static RAM.

5. The apparatus of claim 1 wherein the upgrade storage component is a volatile memory.

6. The apparatus of claim 1 wherein the upgrade storage component is a non-volatile memory.

7. The apparatus of claim 1 wherein the portion of memory is a bank of memory.

8. The apparatus of claim 1 wherein the valid authorization code is stored in the valid authorization component in encrypted form and including a decryptor for decrypting the encrypted valid authorization code.

9. An upgrade controller for enabling any access to a disabled resource of a device, the device not consisting of a portion of memory, the resource, if involved with writing to and/or erasing a portion of memory, the resource not solely involved with the writing to and/or erasing a portion of memory, no access to the resource being enabled until the upgrade controller enables any access, the upgrade controller comprising:

input lines for receiving into the upgrade controller an authorization code for any access to the resource;

an access verifier connected to the input lines that determines whether the authorization code is proper and that, when the authorization is proper, generates a signal to enable any access to the disabled resource, the disabled resource being in an inoperable state in which the disabled resource is unable to provide resource capacity based on having no access enabled to the resource capacity, the enabled resource being in an operable state in which the enabled resource has resource capacity based on having access enabled to the resource capacity;

a storage component connected to the generated signal of the access verifier that stores the generated signal; and output lines for outputting from the upgrade controller the signal stored in the storage component.

10. The upgrade controller of claim 9 including:

a decryptor connected between the input lines and the access verifier for providing a decrypted authorization code to the access verifier.

11. The upgrade controller of claim 9 including:
a valid authorization code storage component connected to the access verifier and provides information to determine whether the authorization code is proper.

12. The upgrade controller of claim 9 including:
an enabling component that selectively enables the output lines based on the output from the storage component and input lines for controlling selection of the resource.

13. The upgrade controller of claim 9 wherein the access verifier compares the authorization code to a predefined authorization code to determine if authorization is proper.

14. The upgrade controller of claim 13 wherein the predefined authorization code is field programmable.

15. The upgrade controller of claim 9 wherein the access verifier is implemented in an application-specific integrated circuit.

16. The upgrade controller of claim 9 wherein the access verifier is implemented in discrete logic.

17. The upgrade controller of claim 9 wherein the access verifier is implemented as instructions for a processor.

18. A system for enabling a hardware resource present in a computer system but not currently enabled, the hardware resource not available to be used by the computer system when the hardware resource is disabled, the hardware resource available to be used by the computer system when the hardware resource is enabled, the hardware resource, if involved with writing to and/or erasing a portion of memory, the hardware resource not solely involved with the writing to and/or erasing a portion of memory, the system comprising:
a vendor upgrade component for generating unique authorization codes for enabling the disabled hardware resource of the computer system, the disabled hardware resource being in an inoperable state in which the disabled hardware resources in unable to provide resource capacity based on having no access enabled to the resource capacity;
a customer upgrade component for receiving the unique authorization code; and
an upgrade controller for receiving from the customer upgrade component the unique authorization code, for authenticating the unique authorization code, and for when authenticated, enabling the hardware resource of the computer system, the enabled hardware resource being in an operable state in which the enabled hardware resource has resource capacity based on having access enabled to the resource capacity.

19. The system of claim 18 wherein the vendor upgrade component and the customer upgrade component are connected via a communications link and the vendor upgrade component provides the unique authorization code to the customer upgrade component via the communications link.

20. The system of claim 18 wherein the unique authorization code is encrypted and the upgrade controller includes a decryptor to decrypt the encrypted unique authorization code.

21. A system comprising:
a device that is operational;
hardware resources that when enabled operate with the operational device, the enabled hardware resources being in an operable state in which the enabled hardware resources have resource capacity based on having access enabled to the hardware resource, the hardware resources, if involved with writing to and/or erasing a portion of memory, not being involved solely with writing to and/or erasing a portion of memory, the hardware resources, when disabled, having no operations with any device of the system including no reading operations, the disabled hardware resources being in an inoperable state in which the disabled hardware resources are unable to provide hardware resource capacity based on having no access enabled to the resource capacity; and
an upgrade controller configured to receive an authorization code, configured to verify that the authorization code is proper, and configured to, when the authorization code is proper, enable the hardware resources.

22. The system of claim 21 wherein the hardware resources are resources of a computer system.

23. The system of claim 22 wherein the hardware resources include memory.

24. The system of claim 22 wherein the hardware resources include a graphics accelerator board.

25. The system of claim 22 wherein the hardware resources include cache memory.

26. The system of claim 22 wherein the hardware resources include an additional processor.

27. The upgrade controller of claim 9 wherein the output lines are coupled to a second controller and the resource is a modem.

28. The upgrade controller of claim 9 wherein the output lines are coupled to a memory controller, the resource is a portion of memory, and access includes any reading from the portion of memory.

29. The upgrade controller of claim 9 wherein the output lines are coupled to a second controller and the resource is an image stabilizer of a video camera.

* * * * *